United States Patent [19]

Hall et al.

[11] 4,318,324
[45] Mar. 9, 1982

[54] CUTTING MACHINE WITH GUARD FOR CUTTING BLADE

[75] Inventors: Stephen R. Hall; Craig L. Lindmark, both of Rockford, Ill.

[73] Assignee: Rock Mill, Inc., Rockford, Ill.

[21] Appl. No.: 189,738

[22] Filed: Sep. 22, 1980

[51] Int. Cl.³ .............................................. B26D 7/22
[52] U.S. Cl. ...................... 83/397; 83/438; 83/490
[58] Field of Search ................ 83/478, 397, 490, 544; 125/13 R, 13 S; 51/98, 99

[56] References Cited

U.S. PATENT DOCUMENTS

| | | | |
|---|---|---|---|
| 1,999,138 | 4/1935 | Mason | 51/99 X |
| 3,834,369 | 9/1974 | Haase | 125/13 S |
| 4,028,975 | 6/1977 | Bennett | 83/478 |
| 4,176,571 | 12/1979 | Batson | 83/397 |

FOREIGN PATENT DOCUMENTS 1052993  9/1953  France .................................. 83/478

Primary Examiner—James M. Meister
Attorney, Agent, or Firm—Leydig, Voit, Osann, Mayer & Holt, Ltd.

[57] ABSTRACT

A cutting machine having a circular cutting tool, such as a saw blade for cutting a workpiece in two, has the blade mounted on an arm to swing from an inactive or raised position above the workpiece down into engagement with the latter. A guard protects the operator of the machine from the blade and includes a cylindrical cover journaled to turn relative to the blade and enclosing both sides and the edge of the blade. A notch is formed in the cover and faces away from the operator when the blade is in the raised position and a link turns the cover automatically as the blade is lowered so that the notch faces downwardly and exposes the blade to the workpiece. When the blade is in the raised position, the notched portion of the cover projects into a shell so that the blade is completely enclosed at that time.

8 Claims, 6 Drawing Figures

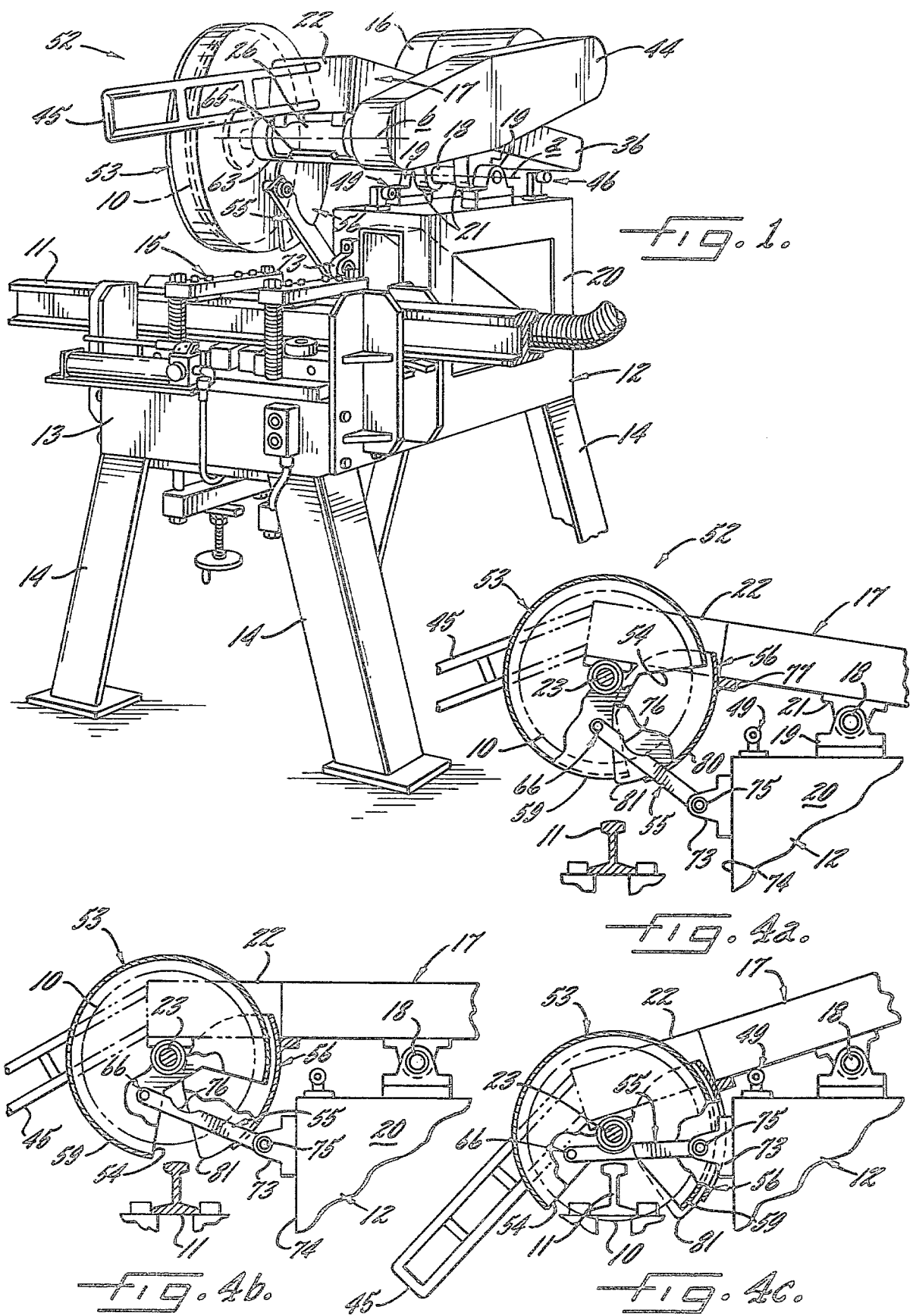

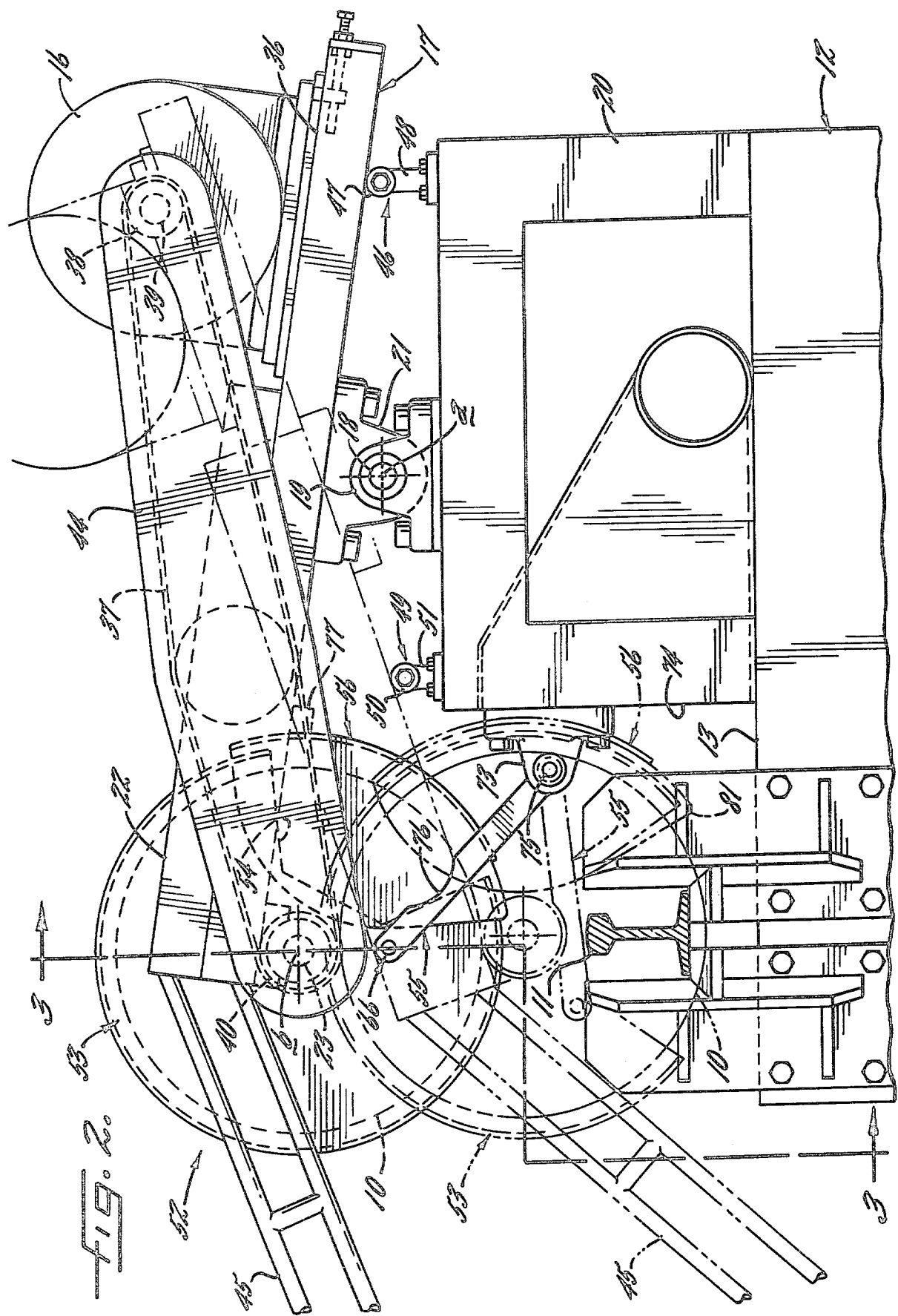

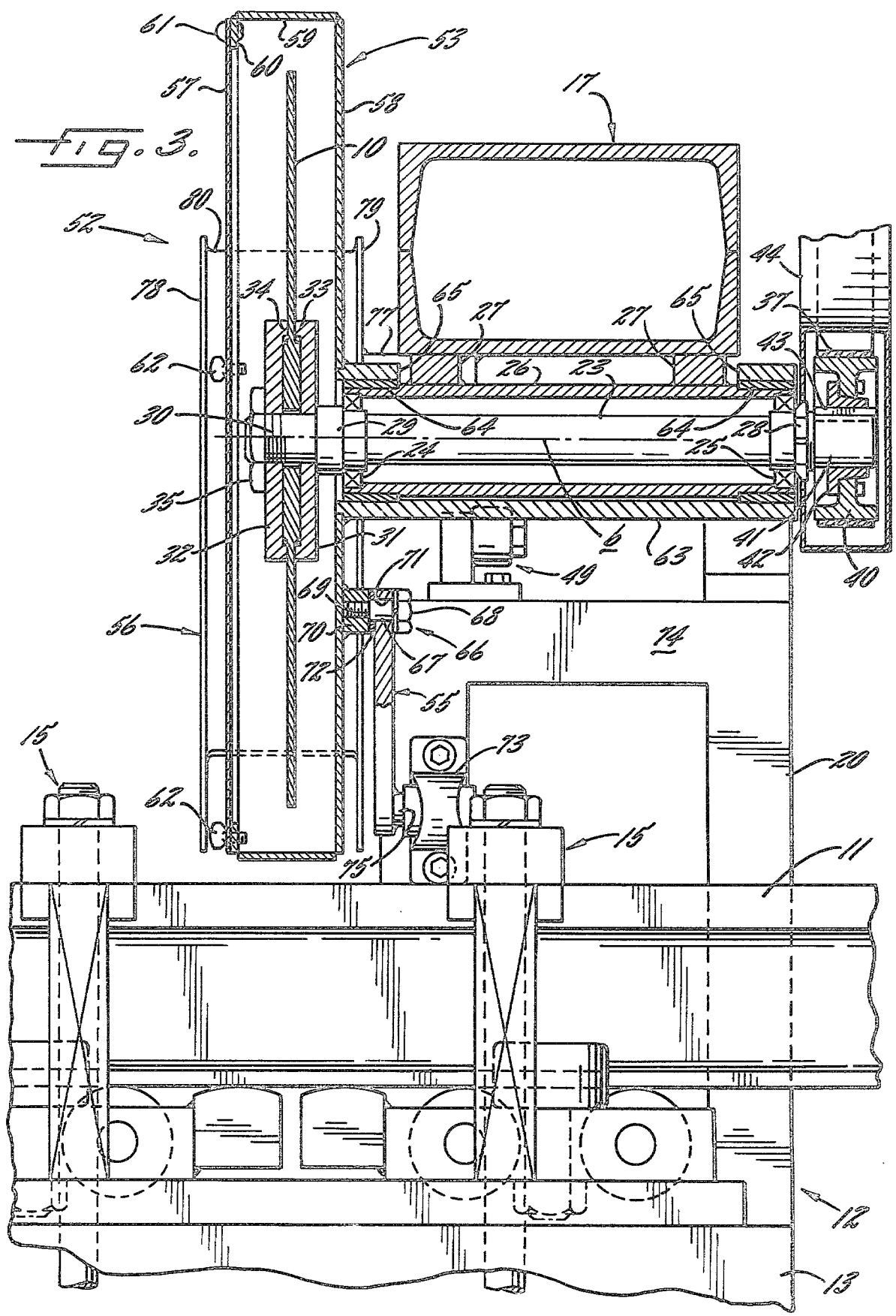

CUTTING MACHINE WITH GUARD FOR CUTTING BLADE

BACKGROUND OF THE INVENTION

The present invention relates to a cutting machine having a circular cutting tool such as a saw blade. The tool is secured to a power rotated arbor shaft and is adapted to cut a workpiece which is clamped to the base. For this purpose, the shaft is mounted on the base, such as by a swinging arm, so that the tool normally is in an inactive position away from the workpiece and is moved manually by the operator into engagement with the workpiece. In some such machines, a guard is mounted around a portion of the tool to protect the operator.

SUMMARY OF THE INVENTION

The general object of the present invention is to provide a cutting machine of the foregoing type with a new and improved guard which essentially covers the cutting tool when the latter is in the inactive position and which exposes the blade to the workpiece automatically as an incident to moving the blade from its inactive position toward the workpiece.

A more detailed object is to form the guard with a cylindrical cover which is journaled on the arbor shaft to enclose both sides and the cutting edge of the tool and which has a notch facing away from the machine operator when the tool is in the inactive position and to connect the cover to the base by a linkage which, as the blade moves from the inactive position toward the workpiece, causes the cover to turn on the arbor shaft so that the notch faces the workpiece and exposes the tool to the latter.

Another object is to incorporate a shell as a part of the guard and to arrange the shell so that it overlaps both sides of the cover and closes the notch in the cover when the tool is in the inactive position.

The invention also resides in the novel construction of the cover, the linkage and the shell and in the novel manner in which these elements are mounted on the base.

BRIEF DESCRIPTION OF THE DRAWINGS

FIG. 1 is a perspective view of a cutting machine embodying my invention.

FIG. 2 is an enlarged fragmentary side view of the machine showing two positions of the tool, parts being broken away and shown in section.

FIG. 3 is an enlarged sectional view taken along the line 3—3 in FIG. 2.

FIG. 4a is a fragmentary schematic side view showing the cutting tool in the inactive position.

FIG. 4b is a view similar to FIG. 4a but showing the tool in an intermediate position.

FIG. 4c is a view similar to FIG. 4a but showing the tool in the position of a full depth cut.

DETAILED DESCRIPTION OF THE PREFERRED EMBODIMENT

As shown in the drawings for purposes of illustration, the invention is embodied in a cutting machine having a circular rotating tool 10 for cutting a workpiece 11. While the tool may be of various types such as grinding wheel or a form cutting tool, it is shown herein as a saw blade. In general, the machine includes a base 12 with a table portion 13 (FIG. 1) supported by legs 14 and the workpiece to be cut, such as a rail 11 of a track, is held in place on top of the table by any suitable clamping mechanism 15. The saw blade 10 is power driven by a motor 16 and is supported on the base to move from an inactive position above the workpiece (see FIGS. 1 and 4a) down into cutting engagement with the workpiece (see FIG. 4c).

In the present instance, the saw blade 10 is mounted on an elongated arm 17 which is pivotally mounted intermediate its ends on the base 12 to swing about a horizontal axis a (FIG. 2) which is parallel to the axis b of the saw blade. To effect this mounting, a stationary shaft 18 having its axis coincide with the axis a is supported by two spaced lugs 19 (FIGS. 1 and 2) secured to and upstanding from the top of a housing 20 which is a part of the base 12 and is on the top of the table portion 13. Two spaced ears 21 depending from the underside of the arm 17 encircle the shaft and turn on the latter to complete the pivotal connection, the ears 21 being disposed between the lugs 19.

The saw blade 10 is carried on the front end portion 22 of the arm 17 and, for this purpose, an arbor shaft 23 (FIG. 3) is journaled on this front end portion with its axis coinciding with the axis b and the saw blade is mounted on the shaft. To support the shaft 23, the latter is journaled in spaced bearings 24 and 25 disposed in a sleeve 26 which is rigidly attached to the underside of the arm by means of spacers 27. The arbor shaft is held against axial shifting by a lock washer 28 on the shaft outside the bearing 25 and by a flange 29 on the shaft abutting the outside of the bearing 24. An end portion 30 of the arbor shaft extends beyond the flange 29 and receives the saw blade. The latter is disposed between two circular disks 31 and 32 which also are received on this end portion of the shaft and the blade is engaged by opposed peripheral flanges 33 and 34 formed respectively on the disks 31 and 32. A nut 35 is threaded onto the end portion 30 of the arbor shaft to hold the disk 31 firmly against the flange 29 and to clamp the saw blade between the disks whereby the blade turns with the arbor shaft.

The motor 16 drives the arbor shaft 23 and preferably is mounted on the rear end portion 36 of the arm 17 behind the pivot shaft 18 as shown in FIGS. 1 and 2. The motor drives the shaft by means of an endless belt 37 trained over a sheave 38 fixed on the output shaft 39 of the motor and a sheave 40 fixed to the arbor shaft. As shown in FIG. 3, the sheave 40 is fixed to an extension 41 of the arbor shaft and is bolted to a bushing 42 which is received on the extension 41 and keyed to the latter as indicated at 43. The sheaves 38 and 40 and the belt 37 are enclosed in a hollow sheet metal guard 44 removably attached to the side of the arm 17 by any suitable means (not shown).

The arm 17 is swung manually about the axis a and, for this purpose, an elongated handle 45 is secured to the arm and projects forwardly from the front end thereof where it is accessible to an operator standing in front of the machine. The motor 16 serves as a counterweight normally holding the arm in the inactive position as determined by the underside of the rear portion 36 of the arm engaging a stop 46 in the form of a horizontal roller 47 (FIGS. 1 and 2) journaled on a bracket 48 which is bolted to the top of the housing portion 20 of the base 12. Thus, to cut the workpiece 11, the operator pulls the handle 45 down against the weight of the motor thereby moving the saw blade 10 down into engagement with the workpiece. As illustrated in broken lines in FIG. 3, the downward movement of the saw blade is limited by the engagement of the underside of the front portion 22 of the arm 17 with a second stop 49. Like the stop 46, the stop 49 is a roller 50 journaled on a bracket 51 which is bolted to the top of the housing 20.

The present invention contemplates the provision of a novel guard 52 which essentially encloses the saw blade 10 when the arm 17, and hence the blade, is in the inactive position and which exposes the blade to the workpiece 11 automatically as an incident to moving the blade from its inactive position toward the workpiece thereby, as compared to prior guards, to more effectively protect the operator of the machine from injury. In general, the guard includes a cylindrical cover 53 which is journaled on the arbor shaft 23 and which encloses both sides and the cutting edge of the blade. The cover is notched as indicated at 54 and, when the blade is in the inactive position, the notch faces away from the operator. Linkage means 55 connects the cover and the base 12 and is operable as the blade is moved toward the workpiece to turn the cover relative to the arbor shaft so that the notch faces the workpiece and exposes the blade to the latter. Preferably, the guard 52 also includes shell 56 which overlaps both sides of the cover 53 and which is in a fixed position relative to the arbor shaft to close the notch 54 when the saw blade is in the inactive position and thus to completely enclose the blade.

Herein, the cover 53 is formed by two circular disks 57 and 58 (FIG. 3) which are larger in diameter than the saw blade 10 and which are disposed on the outside and the inside of the blade respectively. The disks are formed with alined notches which together constitute the notch 54. A sheet metal annulus 59 having a diameter substantially equal to the diameter of the disks is disposed between the latter and is secured to the peripheries of the disks to complete the cover 53, the annulus 59 being interrupted at the notch 54. As shown in FIG. 3, the inner disk 58 is welded to the annulus. With regard to the outer disk 57, however, a ring 60 is welded to the outer edge of the annulus and projects radially inward and the disk 57 is fastened to the ring by a rivet 61 and a plurality of angularly spaced thumb screws 62. Thus, by removing the thumb screws, the disk 57 may be turned about the rivet 61 to open the cover 53 and permit the saw blade 10 to be replaced.

The cover 53 is mounted to turn relative to the saw blade 10 and the arbor shaft 23 by means of a sleeve 63 which is coaxial with the arbor shaft with one end of the sleeve being welded to the disk 58. The sleeve 63 is coextensive in length with the arbor shaft and is journaled on the latter through the medium of the sleeve 26 (see FIG. 3). Thus, the sleeve 63 encircles the sleeve 26 and is journaled on the latter by annular bushings 64 at opposite ends of the sleeves. As shown in FIGS. 1 and 3, the sleeve 63 is cut away at 65 so that the legs 27 connecting the arm 17 and the sleeve 26 do not interfere with the turning of the sleeve 63.

In the present instance, the linkage means 55 is an elongated link pivotally connected at one end to the base 12 at a point lower than the cover 53 when the arbor shaft 23 is in its raised or inactive position and pivotally connected at its other end to the disk 58 of the cover at a point spaced below the arbor shaft when the latter is in the raised position. As shown in FIG. 3, the pivotal connection between the link 55 and the disk 58 is a bolt 66 with an unthreaded portion 67 adjacent the head 68 and a threaded end portion 69 which is threaded into a boss 70 welded to the disk 58. A hole 71 is formed in the adjacent end portion of the link and receives the unthreaded portion 67 of the bolt to turn thereon, a bushing 72 encircling this portion of the bolt and being disposed between the link and the boss 70. To pivotally connect the other end of the link 55 to the base 12, a bearing block 73 is bolted to a front wall 74 on the base housing 20 and the adjacent end portion of the link turns on a shaft 75 (FIGS. 2 and 3) which is welded to the link 55 and is free to rotate within the bearing block 73.

The operation of the link 55 is illustrated in FIGS. 4a, 4b and 4c. Thus, when the arbor shaft 23 is in the raised position as shown in FIG. 4a, the link holds the cover 53 in a position in which the notch 54 faces back toward the wall 74 on the housing 20 and away from the operator standing in front of the machine. In this position, the annulus 59 of the cover is between the saw blade 10 and the workpiece 11. As the operator pulls the handle 45 down to swing the arm 17, the distance between the arbor shaft 23 and the pivot shaft 75 decreases and thus the link 55, being rigid, turns the cover clockwise as viewed in FIG. 4b. This places a portion of the notch 54 over the workpiece so that the saw blade 10 is exposed to the latter. As the arm 17 is swung further, the link continues to turn the cover clockwise exposing more of the saw blade to the workpiece and the blade engages and cuts through the workpiece until the arm 17 engages the stop 49 at which time the parts are in the position shown in FIG. 4c. A notch 76 may be formed in the upper side of the link to provide clearance for the sleeve 63 and thus permit the forward portion of the arm 17 to be swung down to its limit position.

As stated above, the shell 56 is in a fixed position relative to the arbor shaft 23 and it overlaps the cover 53 and encloses the notch 54 when the arbor shaft and the saw blade 10 are in the inactive or raised position so that the blade is completely covered in this position. To these ends, the shell is welded to the end of a bar 77 (FIGS. 3 and 4a) which, in turn, is welded to the underside of the forward end portion 22 of the arm 17 and the shell is generally U-shaped in cross section with the legs 78 and 79 being respectively outside the disks 57 and 58 of the cover 53 and with the base 80 of the shell opposing the periphery of the saw blade. More specifically, the legs 78 and 79 of the shell are similar plates having the general shape of a segment of a circle with a radius somewhat greater than that of the cover disks and being concentric with the arbor shaft 23. The plates also are slightly wider than the notch 54 so that the notch is completely within the shell when the arbor shaft is in the raised position (see FIG. 4a). The base 80 of the shell is an arcuate sheet metal band welded to the peripheries of the plates 78 and 79. As illustrated in FIGS. 4b and 4c, the lower edges 81 of the plates 78 and 79 are located so that they pass clear of the workpiece 11 as the arm 17 is swung down to make a cut.

With the foregoing arrangement, the notch 54 in the cover 53 faces away from the operator and is covered by the shell 56 when the arbor shaft 23 is in the raised position. In this position, therefore, the saw blade 10 is completely enclosed by the cover and the shell. As the forward portion of the arm 17 is swung down to cut the workpiece 11, the link 55 turns the cover about the axis of the arbor shaft and moves the notch 54 out of the shell so that the saw blade is exposed to the workpiece and makes the desired cut. Conversely, when the arm is returned to the starting or inactive position, the link turns the cover in the opposite direction to reposition the notch inside the shell. Thus, when the arbor shaft 23 is in the raised position, the saw blade is fully covered and, when the workpiece is being cut, only so much of the blade is exposed as is necessary to make the cut. As a result, the guard 52 greatly reduces the possibility of injury to the operator of the machine.

I claim:

1. A cutting machine for cutting a workpiece in a preselected plane, said machine comprising a shaft perpendicular to said plane, a circular cutting tool disposed in said plane and secured to said shaft, a base, means supporting said shaft for rotation about its axis and for transverse movement on said base from an inactive position toward the workpiece, said tool rotating with and moving bodily with said shaft thereby to cut the workpiece as the shaft is moved away from said inactive position, power operated mechanism for rotating said shaft, a guard including a cylindrical cover journaled on said shaft to turn relative to the shaft and to move bodily with the shaft and said tool, said cover being larger in diameter than said tool and enclosing the tool, a notch formed in the periphery of said cover to expose a portion of said tool and facing away from the workpiece and from the operator of the machine when said shaft is in said inactive position, and linkage means connecting said base and said cover and being operable as said shaft moves toward said workpiece to turn said cover relative to said shaft and in a direction to cause said notch to face the workpiece thereby to expose said tool to the workpiece.

2. A cutting machine as defined in claim 1 in which said guard also includes a shell mounted to move bodily with said shaft but to remain in a fixed position relative to said shaft, said shell being U-shaped in cross section and disposed to overlap the sides of said cover and to receive said notch when said shaft is in said inactive position.

3. A cutting machine as defined in claim 2 in which the legs of the U-shaped shell are general segments of a circle and are slightly wider than said notch.

4. A cutting machine as defined in either claim 1 or claim 2 in which said linkage means is an elongated rigid link, means pivotally connecting one end of said link to said base, and means pivotally connecting the other end of said link to said cover.

5. A cutting machine for cutting a workpiece in a preselected plane, said machine comprising a shaft perpendicular to said plane, a circular cutting tool disposed in said plane and secured to said shaft, a base, means supporting said shaft for rotation about its axis and for transverse movement on said base from an inactive position toward the workpiece, said tool rotating with and moving bodily with said shaft thereby to cut the workpiece as the shaft is moved away from said inactive position, power operated mechanism for rotating said shaft, a guard journaled on said shaft to turn relative to the shaft and to move bodily with the shaft and said tool, said guard including two circular plates larger in diameter than said tool and coaxial with the tool, one plate being disposed on each side of said tool and said plates having alined notches facing away from the workpiece and from the operator of the machine when said shaft is in said inactive position, an annulus of a diameter substantially equal to the diameter of said plates disposed between the plates and rigidly attached to the peripheries of the plates, said annulus being interrupted at said notches, and linkage means connecting said base and at least one of said plates, said linkage means being operable as said shaft moves toward said workpiece to turn said plates relative to said shaft and in a direction to cause said notches to face the workpiece thereby to expose said tool to the workpiece.

6. A cutting tool as defined in claim 5 in which said guard also includes a shell mounted to move bodily with said shaft but to remain in a fixed position relative to the shaft, said shell being U-shaped in cross section with each leg of the U overlapping the outside of one of said plates and said shell being positioned to receive and cover said notches when said shaft is in said inactive position.

7. A cutting machine as defined in either claim 5 or claim 6 in which said linkage means is an elongated rigid link, means pivotally connecting one end of said link to said base, and means pivotally connecting the other end of said link to said one plate.

8. A cutting machine for cutting a workpiece vertically, said machine comprising a base, an arm pivotally mounted on said base to swing about a horizontal axis and having a free end portion projecting over the workpiece, a horizontal shaft paralleling said axis and journaled on said free end portion to move up and down with the latter as said arm is swung about said axis, a circular cutting tool fast on said shaft and disposed in a vertical plane, said arm having an inactive position in which said tool is spaced above the workpiece and the tool engages the workpiece as said free end of the arm is swung down away from said inactive position, power operated mechanism for rotating said shaft and hence said tool, a guard journaled on said shaft to turn relative thereto and to move bodily up and down with said end portion of said arm, said guard including two circular plates larger in diameter than said tool and coaxial with the tool, one plate being disposed on each side of said tool and said plates having alined notches facing generally inwardly toward said axis when said arm is in said inactive position, an annulus of a diameter substantially equal to the diameter of said plates disposed between the plates and rigidly attached to the peripheries of the plates, said annulus being interrupted at said notches, an elongated link pivotally connected at one end to said base and pivotally connected at the other end to at least one of said plates at a point radially spaced from said shaft, said link being operable when said end portion of said arm is swung down from said inactive position to turn said plates relative to said shaft in a direction to cause said notches to face the workpiece thereby to expose said tool to the workpiece, and a shell rigidly attached to said arm adjacent said shaft, said shell being generally U-shaped in cross section and disposed to overlap said plates and to cover said notches when said arm is in said inactive position.

* * * * *